Aug. 27, 1968  R. B. INMAN  3,398,500

METHOD AND APPARATUS FOR PACKAGING

Original Filed Sept. 23, 1964  2 Sheets-Sheet 1

INVENTOR
RICHARD B. INMAN

BY Cushman, Darby & Cushman
ATTORNEYS

Aug. 27, 1968 R. B. INMAN 3,398,500
METHOD AND APPARATUS FOR PACKAGING
Original Filed Sept. 23, 1964 2 Sheets-Sheet 2
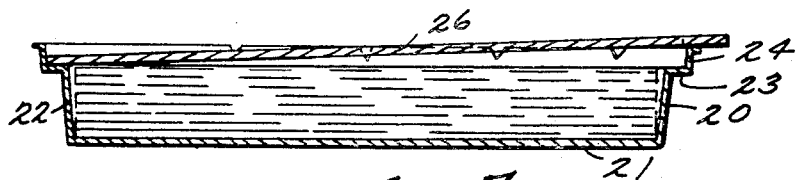
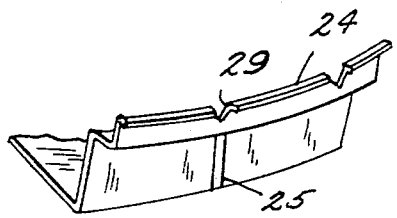
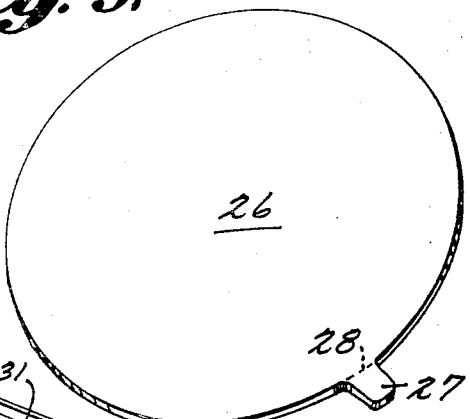
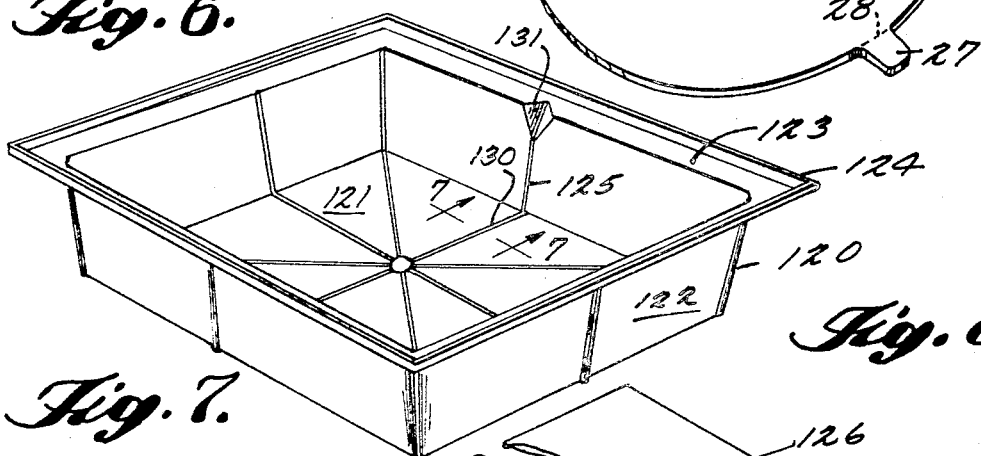
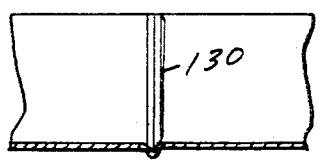
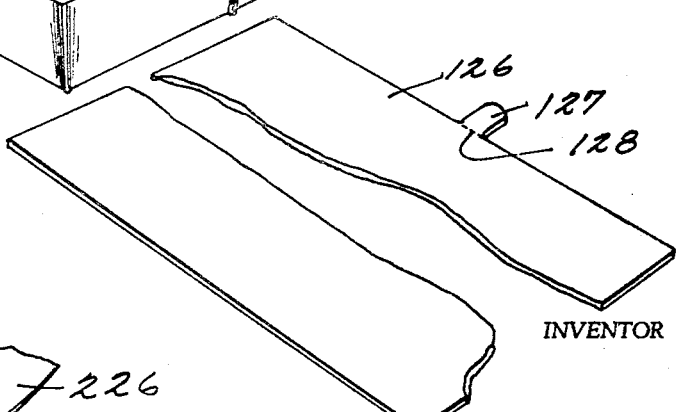
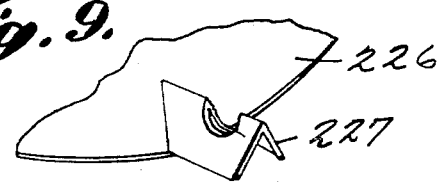
INVENTOR
RICHARD B. INMAN
BY Cushman, Darby & Cushman
ATTORNEYS United States Patent Office 3,398,500
Patented Aug. 27, 1968

3,398,500
METHOD AND APPARATUS FOR PACKAGING
Richard B. Inman, Atlanta, Ga., assignor to Scientific Atlanta, Inc., Atlanta, Ga., a corporation of Georgia
Continuation of application Ser. No. 398,721, Sept. 23, 1964. This application June 30, 1967, Ser. No. 650,546
11 Claims. (Cl. 53—22)

ABSTRACT OF THE DISCLOSURE

Apparatus comprising a chamber divided into a first compartment and a second compartment, means for advancing packages from the first to the second compartment, a membrane separating the compartments spaced from a wall of the chamber to provide an opening for transferring the packages between the compartments, means for withdrawing air from the first chamber, and means for flowing inert gas into the second chamber.

---

Figure 1:
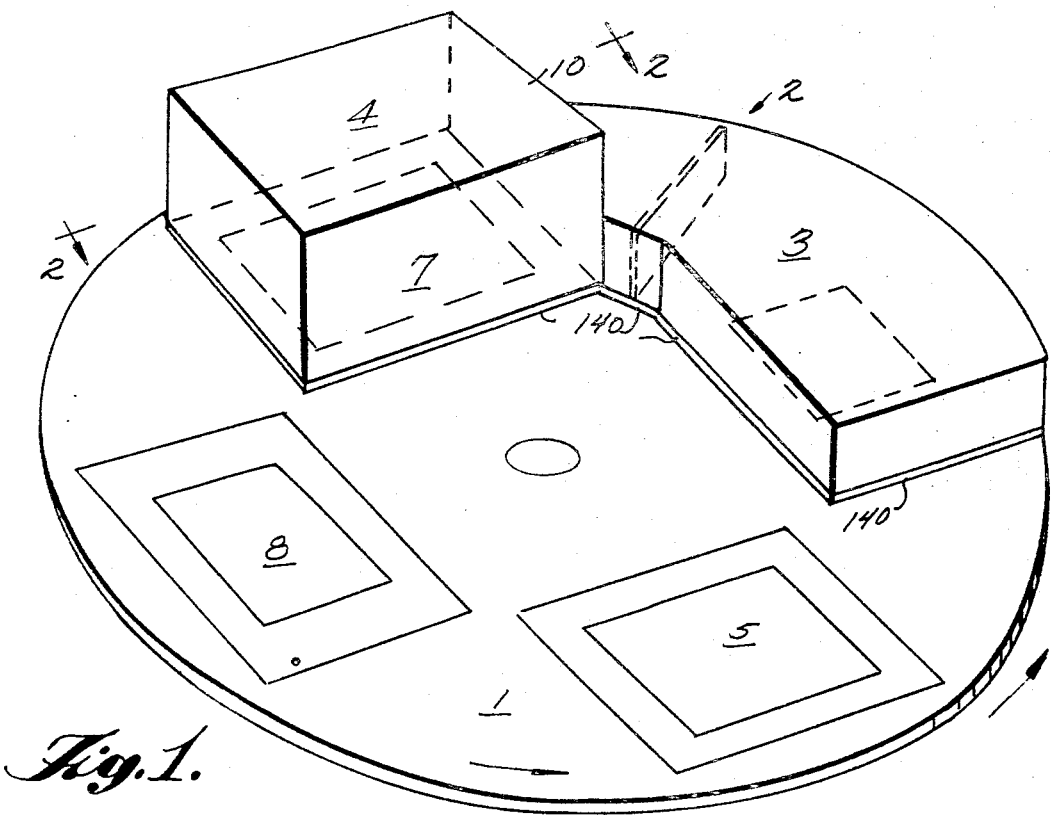

This application is a continuation of Ser. No. 398,721, filed Sept. 23, 1964, now abandoned.

The present invention relates to packaging and, more particularly, to packaging in containers of rigid, transparent or translucent plastic of products such as sliced luncheon meats and other perishable goods. The invention embraces a novel apparatus including a conveyor for removing air from packages, replacing it with inert gas and sealing it while the package is advanced by the conveyor.

It is an important object of the present invention to provide improvements in the packaging of sliced luncheon meat for display in open cases of self-service stores. A large proportion of all sliced luncheon meats such as ham, salami, corned beef and bologna sold is now prepackaged in transparent plastic wrapping for display in refrigerated cases. Several types of package are available for such purposes. Of these, many are constructed of flexible plastic film wrapped tightly about the meat. Recently stiff backings have been used and the meat has been wrapped in a flexible plastic film secured to the rigid backing. One form of this type of package which is used is made under United States Patents 2,787,552 and 3,086,869.

There is a significant disadvantage inherent in most packages made of flexible wrapping in that they are not permanent receptacles for the contents. Frequently, the flexible wrapping must be torn or unfolded to remove the contents, making reclosing difficult. In addition, when the contents are removed, it is often difficult to replace the unused portion.

Because of these difficulties, a package has recently been made available which has a compartment of a rigid transparent plastic sheet and a metal lid. The metal lid has a beaded edge which engages the edge of the plastic compartment and a tacky material is employed to releasably seal and reseal these edges together.

The new package has enjoyed considerable success and has been well received because of its advantages and more attractive appearance. However, it is considerably more expensive than packages made of flexible films, costing approximately two cents more per package at the present time. This extra cost must be balanced by the use of poorer quality meat if the packaged product is to remain competitively priced. Consequently, there is a need for a rigid plastic package which has the advantages of this construction but which can be produced at approximately the same cost as those constructed of flexible packaging material.

There is another problem associated with packaging sliced luncheon meats owing to their sensitivity to oxygen in the air. Because of this problem, it has been customary to subject the packages to fairly strong vacuum before sealing. Vacuum is particularly useful with packages wrapped in flexible film because the film is drawn against the contents to provide a neat package. However, this is not entirely satisfactory because the vacuum tends to draw moisture and flavor from the meat and give it a slimy appearance.

In the U.S. patent application of Harmon B. Miller, Ser. No. 384,846, filed July 24, 1964, now Patent No. 3,351,265, there is described and claimed a novel package which possesses the advantages of the above-described rigid plastic container to package sliced luncheon meats enclosed in a blanket of inert gas, thereby avoiding previous difficulties associated with vacuum packaging. That package comprises a hollow receptacle member or compartment of rigid plastic sheet having a bottom and sides and a laterally-extending generally flat sealing flange at the upper edges of the sides. An upright lip extends from at least a part and preferably all of the outer edge of the sealing flange and a lid is provided of approximately the same size and shape as the upper portion of the container which is sufficiently large to overlie the sealing flange and to fit relatively tightly against the inner side of the lip. The lid has a laterally protruding tab which, prior to closing the container, rests on the lip, and which is bent up during the closing step, to permit the lid to be pressed down against the sealing flange.

An object of the present invention is to provide apparatus for closing and sealing these packages and for replacing air within the container with an inert gas as the packages are fed into and advanced through the apparatus. Briefly stated, this and other objects are achieved in apparatus comprising a chamber divided into a first compartment and a second compartment, means for advancing packages from the first to the second compartment, a membrane separating the compartments spaced from a wall of the chamber to provide an opening for transferring the packages between the compartments, means for withdrawing air from the first chamber, and means for flowing inert gas into the second chamber.

Figure 2:
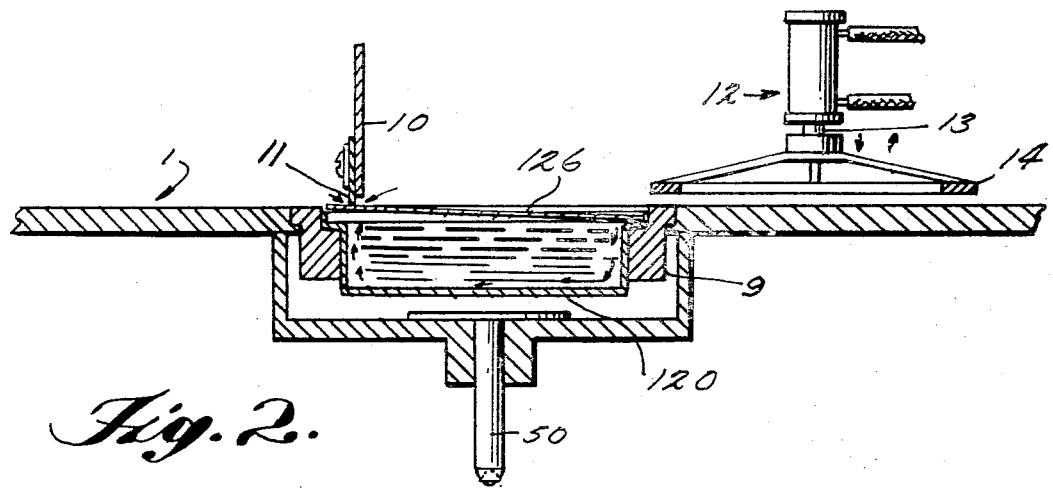

The apparatus will be better understood from the following detailed description of a preferred form thereof and by reference to the drawing in which:

FIGURE 1 is a perspective view of the apparatus;
FIGURE 2 is a cross-section of a part of the apparatus along line 2—2 of FIGURE 1;
FIGURE 3 is a cross-sectional elevation of one form of package useful in the apparatus of FIGURE 1;
FIGURE 4 is a perspective view of a part of the package of FIGURE 3;
FIGURE 5 is a perspective view of a lid for the package of FIGURE 3;
FIGURE 6 is a perspective view of the receptacle part of another form of package useful in the apparatus of FIGURE 1;
FIGURE 7 is a perspective view, partially in section along line 7—7 of FIGURE 6;
FIGURE 8 is a perspective view of a lid for the package of FIGURE 6; and
FIGURE 9 is a perspective view of another form of lid.

In the embodiment shown in FIGURE 1, the apparatus comprises a rotating circular conveyor table 1, and a chamber indicated generally at 2 which is divided into a vacuum compartment 3 and an inert gas compartment 4. The table is circular and is mounted for rotation on a shaft (not shown) fastened to its lower side at the center. Means (also not shown) are provided for rotating the table on this shaft. There are four openings 5, 6, 7 and 8 in the table equidistant from the center and spaced 90° from each other and within each there is an open top basket 9, seen best in FIGURE 2, which holds a package as it is moved through chamber 2.

Compartment 3 is connected by a conduit (not shown) to a vacuum pump, capable of fairly rapid removal of air, although it need not be capable of creating a high vacuum. It is satisfactory if the pressure in this compartment is reduced to about 60% of atmospheric pressure.

The compartment 4 is connected by a similar conduit (not shown) to a source of inert gas. For example, it may be connected to a tank of nitrogen or carbon dioxide under pressure, or to a Dry Ice evaporator. The source of inert gas should be capable of maintaining the pressure in compartment 4 at about 5 p.s.i. gauge.

Between the compartments 3 and 4 there is a wall 10. This may be constructed of any suitable rigid material such as steel or plywood. A membrane 11 is fastened at the lower edge of the wall 10, extending across the full width thereof, by screws or other suitable means. This membrane is constructed of a flexible material which may be easily displaced by a package moving with the table 1, but normally extends down to touch or almost touch the top of the table.

Within the compartment 4 there is a closing and sealing press designated generally by 12. It comprises a piston 13 driven by hydraulic pressure and a heat sealing ring 14 connected to the piston by rods as shown. The ring 14 will correspond in shape with the lid of a package to be pressed into place, in a manner to be described further herein. The ring 14 has an internal electrical heating element connected by wires (not shown) to a regulated source of electricity which may be controlled by a thermostat having a sensing element in the ring, all being of conventional construction for heat sealing of plastics.

For efficiency of operation, there is a sealing gasket 140 along the lower edges of the side walls of the chambers 3 and 4, and resting on the table 1, which prevents leakage of air into or gas from the interiors of the chambers.

The pressure differential between the two chambers may be maintained by adjusting either the vacuum in chambers 3 or the positive pressure in chamber 4. Actually it is possible to operate without any vacuum in chambers 3 by increasing the pressure in chamber 4 to about 10 p.s.i. gauge. If this is done, chamber 3 can be omitted. However, when this is done, more inert gas will leak from chamber 4, thus increasing the cost of operation.

A slight positive pressure of the package, when it is sealed also is useful in opposing introduction of air, should the package have a slight leak.

Of the inert gasses which can be used, carbon dioxide is particularly desirable because it has about 50% higher density than air. Thus it will be aided in lifting air from the package.

It will be observed that the baskets 9 are closed at the bottom to prevent pressure differential from lifting the package from the basket when it is in the vacuum chamber. There is a piston 50 slidably mounted through an opening in the bottom of the basket. After the package is sealed, the piston rides onto a cam surface which lifts it to eject the package.

The packages for which the apparatus is particularly useful, as described in the aforesaid application of Harmon B. Miller, are shown in FIGURES 3–8. Referring first to the form shown in FIGURES 3–5, the package comprises a receptacle 20 having a bottom 21, side wall 22, a lateral flat sealing flange 23 extending from the top of wall 22, and an upstanding lip 24 extending from the outer edge of the sealing flange. The upper edge of the lip is rolled to prevent a person using a package from cutting himself.

As shown in FIGURE 4, the side wall of the receptacle has a groove 25 in its inner face from the sealing flange to the bottom to permit flow of air and gas around the contents. In addition, the side wall is tapered upwardly and outwardly to facilitate the insertion of, e.g., sliced luncheon meat, and also to permit some additional air and gas flow around the meat.

A lid 26 is provided which has approximately the size and shape of the sealing flange 23 so as to fit snugly against the lip 24. At one side, there is a tab 27 which is foldable with respect to the lid 26 along a score line 28. When the lid is first placed on the container, the tab rests on a lip 24, thus raising one side of the lid above the sealing flange 23 while the opposite side of the lid rests on the sealing flange. This permits egress and ingress of air and inert gas from and into the receptacle through the space between the lid 26 and the sealing flange. However, when the lid is later closed, the tab is folded up along score line 28.

As can be seen in FIGURES 3 and 4, the lip 24 has notches 29 through it to further facilitate the flow of air and gas in the space between the lid and the sealing flange.

FIGURES 6–8 illustrate another embodiment of the package which is square and has modified means to facilitate flow of air and gas. There is a receptacle 120 having a bottom 121, side walls 122, a lateral sealing flange 123 and an upright lip 124. As shown in FIGURE 8, there is also a lid 126 and a tab 127 foldable with respect to each other along score line 128. The side walls of the receptacle have grooves 125 in their inner surfaces, and there are grooves 130 in the upper face of the bottom 121 connected to the lower ends of grooves 125. In addition, there is a notch 131 formed in the plastic at the corner of the sealing flange and the side wall, at the top of a groove 130. Preferably, this notch is positioned near the point where tab 127 is placed when the package is covered.

FIGURE 9 illustrates a further embodiment in which the tab, indicated by 227, is folded lengthwise as shown in and out of the plane of the lid to form an air-gas passageway.

In use, a receptacle is filled with, say, sliced luncheon meat and the lid is placed over it as shown in FIGURES 2 and 3. For convenience, the steps in using the apparatus will be described with respect to the square package of FIGURES 6–8. The package is placed in one of the baskets 5–8 and the table 1 is turned. The package first passes under the outer wall of the compartment 3 and into that compartment where air is exhausted from it. Then it moves under the membrane 11 into the compartment 4. As the leading edge of the package is moved into the latter compartment, inert gas begins to flow into the space between the lid 126 and the receptacle 120, compressing air remaining therein. Since part of the package is still in compartment 3 where vacuum prevails, the air compressed toward the trailing part is exhausted into that compartment. Consequently, there is a sweeping action in which the inert gas pushes air ahead of it through the package and into the vacuum chamber. As a result, it is not necessary to apply excessive vacuum in compartment 3, so as to draw juices and flavor from the meat and require more expensive vacuum equipment.

When the package moves into position under the ring 14, the piston 13 is actuated, and the ring presses the lid 126 into the package and against the sealing flange 123. The lid and/or the sealing flange has a coating of a heat sealing material, and the ring 14 is heated to effect sealing. In order to accomplish this, the turning of the table 1 is interrupted momentarily. Then, when the table again turns the package is moved out of compartment 4 and is removed from the table.

It will be appreciated that, in place of the rotating table 1, any other form of conveyor may be used, for example, one traveling in a straight line path. The positions of the compartments 3 and 4 will be changed in accordance with the kind of conveyor used, in a manner which will be readily understood. In place of a heat seal between the lid and the sealing flange, a pressure-sensitive adhesive may be used, as described in the aforesaid application, in which case the heating means associated with ring 14 may be omitted. The apparatus also may be enlarged to include package filling equipment and to permit placing the lid on the package within compartment 4, rather than prior to entry in the vacuum compartment 3. Other changes may be made in the details of construction and mode of operation, without departing from the scope of the invention, as set forth in the claims.

What is claimed is:

1. An apparatus for flushing an at least partially open package with gas comprising a chamber divided into first and second compartments, means for evacuating air from said first compartment, a source of inert gas and means for introducing said inert gas into said second compartment, a wall separating said first and second compartments having an opening therein to provide a passageway for movement of a package from said first compartment to said second compartment, a flexible membrane fastened to said separating wall and substantially closing said passageway, and conveyor means for moving said package from said first compartment to said second compartment past said membrane, whereby as said package enters said second compartment, inert gas flows into the package, sweeping air in the package into said first compartment.

2. An apparatus as set forth in claim 1 including means within said second compartment for closing said package.

3. An apparatus as set forth in claim 2 including heat sealing means associated with said closing means for hermetically sealing the package.

4. An apparatus as set forth in claim 1 in which said conveyor comprises a wall of said chamber and said separating wall is spaced from the conveyor to define said passageway, so that packages on said conveyor are moved along one side of said chamber.

5. An apparatus as set forth in claim 1 in which said conveyor has an opening therein receiving said package and said passageway includes a narrow space between said conveyor and said separating wall, said membrane substantially closing said narrow space.

6. An apparatus as set forth in claim 5 in which said conveyor comprises a wall of said chamber so that packages in said conveyor are moved along one side of said chamber.

7. An apparatus as set forth in claim 6 in which said conveyor is a rotating table passing under an open side of said chamber to form a wall thereof.

8. A method of flushing with gas a package having one open side and space around the contents thereof comprising introducing said package into a first compartment, evacuating air from said first compartment, moving said package from said first compartment to a second compartment through a passageway which is substantially filled by said package, and maintaining in said second compartment inert gas at a pressure greater than the air pressure in said first compartment whereby air is drawn from said package in said first compartment, and, as said package moves into said second compartment, inert gas flows into the space around the contents thereof and sweeps air in said space into said first compartment before the package completely leaves said first compartment.

9. A method as set forth in claim 8 including the steps of placing a lid loosely on the package so as to leave a space between the lid and the package, prior to introducing the package into said first compartment, and sealing said lid to said container in said second compartment after the package has been filled with inert gas.

10. An apparatus for flushing an at least partially open container with gas comprising:

a plurality of wall members defining a partially enclosed gas flushing chamber, means stationary with respect to said chamber for evacuating air from a container in said chamber and introducing another gas into said container, a conveyor in sliding engagement with at least some of said walls to substantially close said chamber and for moving said container into communication with the interior of said chamber to be flushed with gas, said conveyor comprising a moving wall of said chamber, said conveyor having an opening receiving said container and an elevated lid on said package, and means for supporting said container and lid within said opening and below the surface of said conveyor, and means for moving said conveyor slidably past said plurality of wall members, whereby said container may be placed in said conveyor outside said chamber with a lid resting on it and partially elevated to permit access of gas into said container and whereby said container with said elevated lid may be moved into said chamber past the wall members which slidably engage said conveyor without substantial gas leakage from said chamber to the atmosphere.

11. Apparatus as set forth in claim 10 in which said means for evacuating air and introducing gas comprises a pair of conduits opening into said chamber at spaced points whereby spaced points of said container may be simultaneously exposed to gas and vacuum permitting the gas to sweep through the package.

References Cited

UNITED STATES PATENTS 3,189,505    6/1965    Sloan et al. _____ 53—22 X

TRAVIS S. McGEHEE, *Primary Examiner.*